Figure 1:
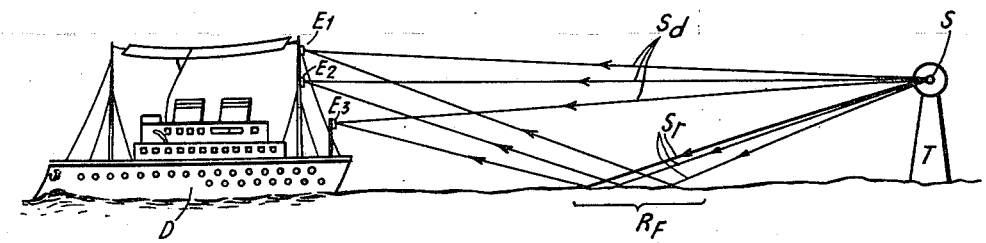

July 13, 1937.     H. SCHARLAU     2,086,742
RADIO RECEIVING SYSTEM
Filed July 17, 1935

INVENTOR
HANS SCHARLAU
ATTORNEY

Patented July 13, 1937

2,086,742

UNITED STATES PATENT OFFICE 2,086,742

RADIO RECEIVING SYSTEM

Hans Scharlau, Berlin, Germany, assignor to Telefunken Gesellschaft für Drahtlose Telegraphie m. b. H., Berlin, Germany, a corporation of Germany Application July 17, 1935, Serial No. 31,799
In Germany July 5, 1934

2 Claims. (Cl. 250—11)

The object of this invention is to provide ways and means to insure reception on meter or decimeter waves by the aid of two or more receivers placed a relatively small distance apart, preferably in superposition.

Means and ways designed to obviate fluctuations in the incoming signal strength are known in the prior art in which several sending and receiving stations are so disposed that the receivers are struck by differential beams or concentrated radiations, that is to say, beams coming in from space at different angles. These arrangements are designed for wave-lengths ranging between one hundred meters down to fifteen meters, approximately; in other words, for cases where the incoming energy has been reflected by the Heaviside layer, in fact, where reception is feasible at all only over the said path. Accordingly, as known from arrangements disclosed in the prior art, the stations must be mounted at distances ranging between several hundred meters up to many kilometers.

Now, the present invention is concerned with an arrangement adapted to safeguard reception on meter and decimeter waves. For these ultrashort waves, reception by way of reflection from the Heaviside layer is no longer feasible. In fact, when working with meter or decimeter waves, reception is predicated primarily upon direct radiation over relatively short distances between transmitter and receiver apparatus, since the propagation of such waves is governed by quasi-optical laws. It has been found, in this connection, that in the presence of large reflecting objects or obstacles in the neighborhood of the direct path of travel of the rays or upon the surface of the ground (earth) or sheets of water, marked reflections are occasioned, with the result that interference actions between direct and reflected waves occur in the receiver. Especially where transportable transmitters or receivers are concerned, it has been found that parallel to the reflecting surfaces, at definite recurring distances, zones of zero reception (shadows or skip zones) will be found in which reception by the co-action of several radiations coming in over different routes is markedly diminished or even extinguished. In these zones the points of maximum reception are but little apart from those of minimum reception, in fact, the distance is mostly a few wave lengths.

The points of minimum signal strength are situated in surfaces or areas which are approximately parallel to the really or primarily reflecting surfaces. The distance $a$ of these zero-reception receiving zones is a function of the angle $\alpha$ at which the radiations come in or are reflected:

$$a = \lambda/2 \cdot \gamma \sin\alpha; \text{ for } \alpha = 90°, \text{ there is } a = \lambda/2,$$

where $\lambda$ is the wave length.

Now, the purpose of the invention is to create means adapted to safeguard reception in radio communication by the aid of meter or decimeter waves which has this characteristic feature, that at the receiving end, at relatively little distance from one another, there are provided, preferably in superposition, two or more stations having their output ends interconnected.

Normally the reflected surfaces are placed parallel to ground (water sheets or surface of earth itself) so that the receivers must be placed above one another. However, such surfaces also may produce a reflector effect as they may present an angle in reference to the earth's surface (slopes of valleys, mountain ranges, etc.). In cases of this kind, it may be generally stated that the receivers must be at different distances from one another as regards the direction at right angles to the reflecting surfaces.

For practical reasons, the receiver equipments should be supplied from common voltage sources, the radio frequency energy should be separately amplified and rectified, while a common audio frequency amplifier is provided with the central location. Simultaneous operation and manipulation of the receivers is readily conceivable. The ways and means of insuring electric and mechanical remote control need not be stated in more detail seeing that any of the schemes known from the prior art and familiar to the expert's routine work may be utilized, this part of the construction thus not falling within the scope of the invention.

In instances where the main direction of incidence of the reflected radiations is exactly known, the effect of the undesired radiation may be minimized by suitable reflector arrangements or by the interposition of polarization grates so that the receiver in question would be struck only by the direct radiations. By the use of such grates, the reflected radiations which are mostly polarized in one plane may be precluded; in other words, the points of zero reception for an individual receiver, if need be, may be shifted so that no extinction is liable to happen at the point of adjustment of the receiver.

In order that reception of short waves may be insured in the presence of local interference actions, it would also be feasible to place two independent receivers at close proximity to each other, one of which would pick up predominantly the electrical component and the other one the magnetic component of the electromagnetic waves or radiations. This is predicated upon the consideration and idea that points characterized by minimum electric field intensities and points of minimum magnetic field intensity are in different space positions. The distance $b$ between the various minimum values are by analogy:

$$b = \lambda/4. \; \gamma \sin \alpha.$$

The receiving antenna to pick up the electrical component may consist, for instance, of a dipole arrangement, and that for the magnetic component of a small loop or coil antenna.

Figure 2:
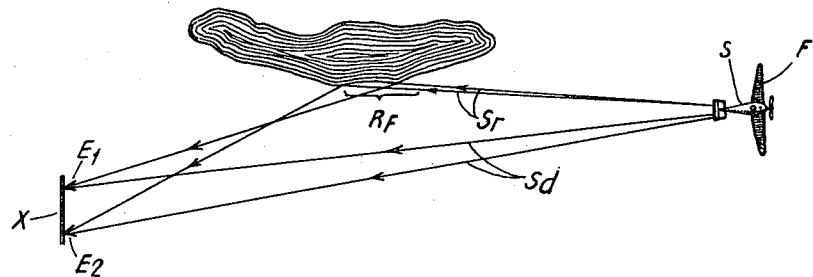
Figure 3:
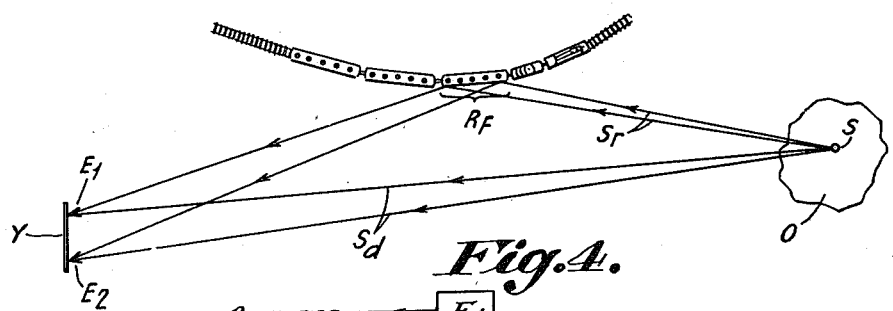
Figure 4:
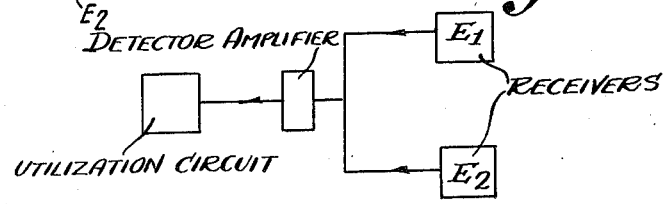

Exemplified embodiments of the arrangement of this invention are illustrated in Figs. 1, 2, and 3. Fig. 4 illustrates in box form that the outputs of two or more receivers are combined.

Referring to Fig. 1, T denotes, for instance, a lighthouse tower equipped with a suitable (directed or non-directed) radiator S. At some distance therefrom is a marine vessel D comprising, for instance, three suitable receivers $E_1$, $E_2$ and $E_3$, generally spaced from one another by a distance greater than the length of the communication wave. Lines $S_d$ are to indicate the radiations proceeding directly from the transmitter to the receiver. The broken lines $S_r$ are to indicate radiations which are deflected and reflected from some reflective surface $R_F$, such as a sheet of water, and which over this circuitous route reach receivers $E_1$, $E_2$ and $E_3$.

Referring to Fig. 2, F denotes, for instance, an airplane with a suitable radiator S. At a certain distance therefrom is a stationary station X comprising two receivers $E_1$ and $E_2$. Lines $S_d$ represent the paths of the direct rays, and lines $S_r$ the routes of radiations which have been reflected from a surface $R_F$ such as a mountain range.

In Fig. 3, S represents a convenient radiator which is stationarily mounted at a place marked O. Y is a stationary receiving point comprising two receivers $E_1$ and $E_2$. Inside the radiation zone of radiator S, between radiator S and receiver Y, say roughly parallel to the direct route of the radiations between transmitter and receiver, moves a comparatively large object presenting reflecting surfaces, such as a train. Lines $S_d$ again denote the path of direct radiations, and $S_r$ the path of radiations reflected from the train.

Fig. 4 illustrates, diagrammatically, in box form, how the plurality of receivers may be combined in their outputs.

What is claimed is:

1. An ultrashort wave receiving system for receiving waves of the order of one meter and less, comprising two receivers mounted one above the other and separated from one another by a distance greater than the length of the communication wave, one receiver being arranged to receive the electrical component and the other receiver arranged to receive the magnetic component of the electromagnetic wave, a reflecting surface for reflecting energy impinging on said surface from a distant transmitter towards said receivers, said receivers being located at different distances from said surface, and means for combining the outputs of said two receivers.

2. In a communication system utilizing ultrashort electromagnetic waves of the order of one meter and less, a receiving system comprising two receivers located adjacent one another and separated by a distance greater than the length of the communication wave, a single support for both of said receivers, a reflecting surface for reflecting energy impinging on said surface from a distant transmitter towards said receivers, said receivers being located at different distances from said surface, and means for combining the outputs of said two receivers.

HANS SCHARLAU.